US008006874B2

(12) United States Patent
Smith et al.

(10) Patent No.: US 8,006,874 B2
(45) Date of Patent: Aug. 30, 2011

(54) CHILD RESISTANT CLOSURE FOR A TAP

(75) Inventors: Mark Smith, Romeoville, IL (US);
Loren L. Brelje, Glencoe, MN (US);
James L. Richards, Dassel, MN (US)

(73) Assignee: DS Smith Plastics Limited, London (GB)

( * ) Notice: Subject to any disclaimer, the term of this patent is extended or adjusted under 35 U.S.C. 154(b) by 572 days.

(21) Appl. No.: 12/074,349

(22) Filed: Mar. 4, 2008

(65) Prior Publication Data
US 2009/0014479 A1 Jan. 15, 2009

(51) Int. Cl.
*B67D 3/04* (2006.01)
(52) U.S. Cl. .................. 222/505; 222/548; 251/269
(58) Field of Classification Search .......... 222/505, 222/548, 509, 549, 105, 566; 251/269
See application file for complete search history.

(56) References Cited

U.S. PATENT DOCUMENTS

| | | | | | |
|---|---|---|---|---|---|
| 1,629,303 | A | * | 5/1927 | Phillips | 222/519 |
| 1,912,304 | A | * | 5/1933 | Phillips | 222/513 |
| 2,186,499 | A | | 1/1940 | Riva | |
| 3,203,665 | A | * | 8/1965 | Grant et al. | 251/351 |
| 3,206,075 | A | * | 9/1965 | Scholle | 222/105 |
| 4,997,108 | A | * | 3/1991 | Hata | 222/105 |
| 5,004,127 | A | * | 4/1991 | Morel | 222/521 |
| 5,947,331 | A | * | 9/1999 | Goncalves | 222/39 |
| 6,477,743 | B1 | * | 11/2002 | Gross et al. | 222/525 |
| 7,219,819 | B2 | * | 5/2007 | Halfacre et al. | 222/484 |

OTHER PUBLICATIONS

WO, Written Opinion of the International Searching Authority, Rapak, LLC, Mar. 3, 2008.

* cited by examiner

*Primary Examiner* — Kevin P Shaver
*Assistant Examiner* — Donnell Long
(74) *Attorney, Agent, or Firm* — Joseph A. Fuchs

(57) ABSTRACT

The present invention provides a tap assembly including: (1) a first wall defining a valve chamber having a top surface and a pair of opposed tracks extending axially along an inner surface of the wall, and a fluid outlet; (2) a tap handle mounted to the top surface for rotational movement of the tap handle with respect to the wall, the tap handle having a second wall defining an annular chamber supporting a set of threads; and (3) a generally tubular valve member having a first end and an opposed second end, the first end having a pair of lugs circumferentially spaced from one another, the lugs being positioned within the threads, the second end of the valve member extending into the valve chamber, the valve member is responsive to movement of the tap handle to move from a first position where the fluid outlet is sealed by the second end of the valve member to a second position where the fluid outlet is not sealed by the second end of the valve member and fluid is allowed to flow through the fluid outlet.

33 Claims, 5 Drawing Sheets

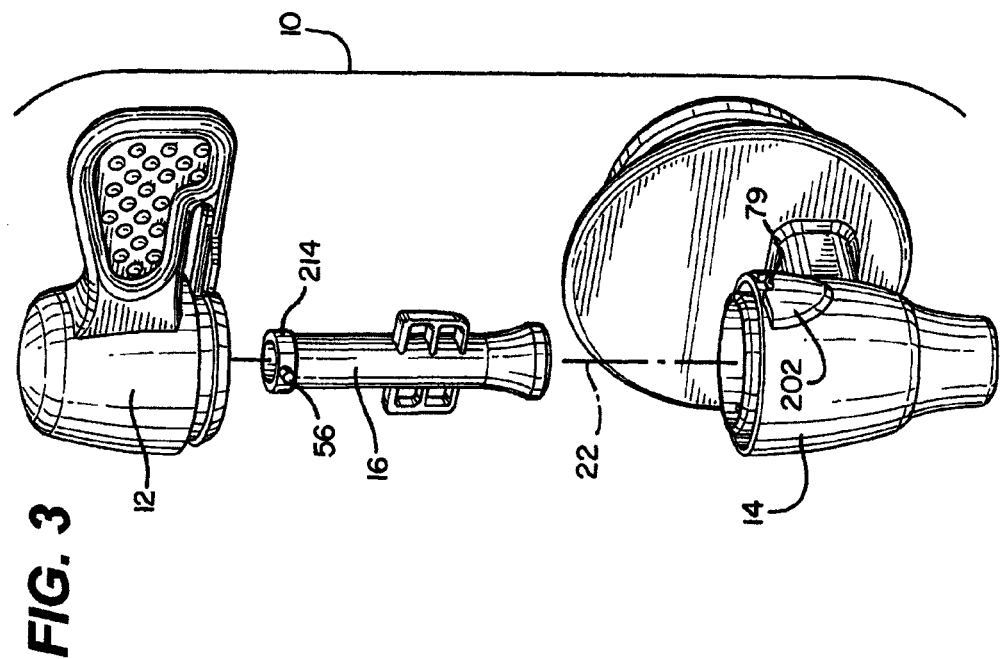
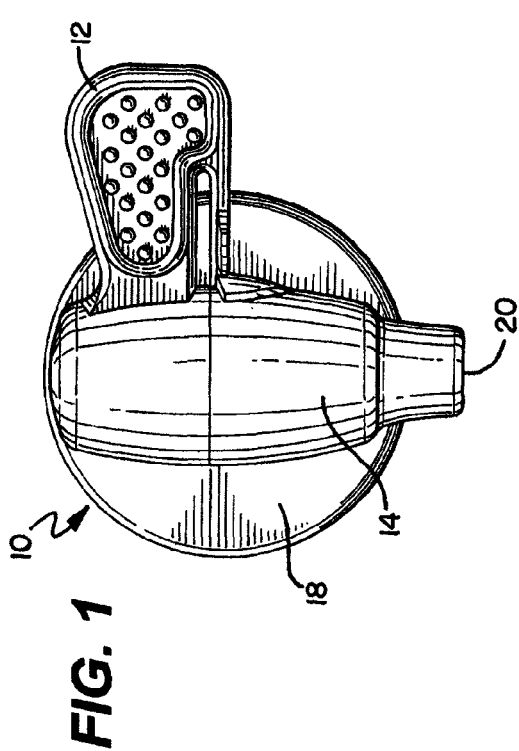
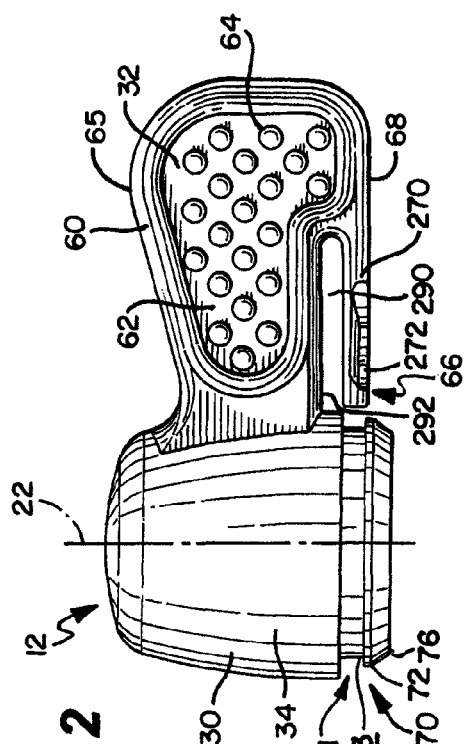

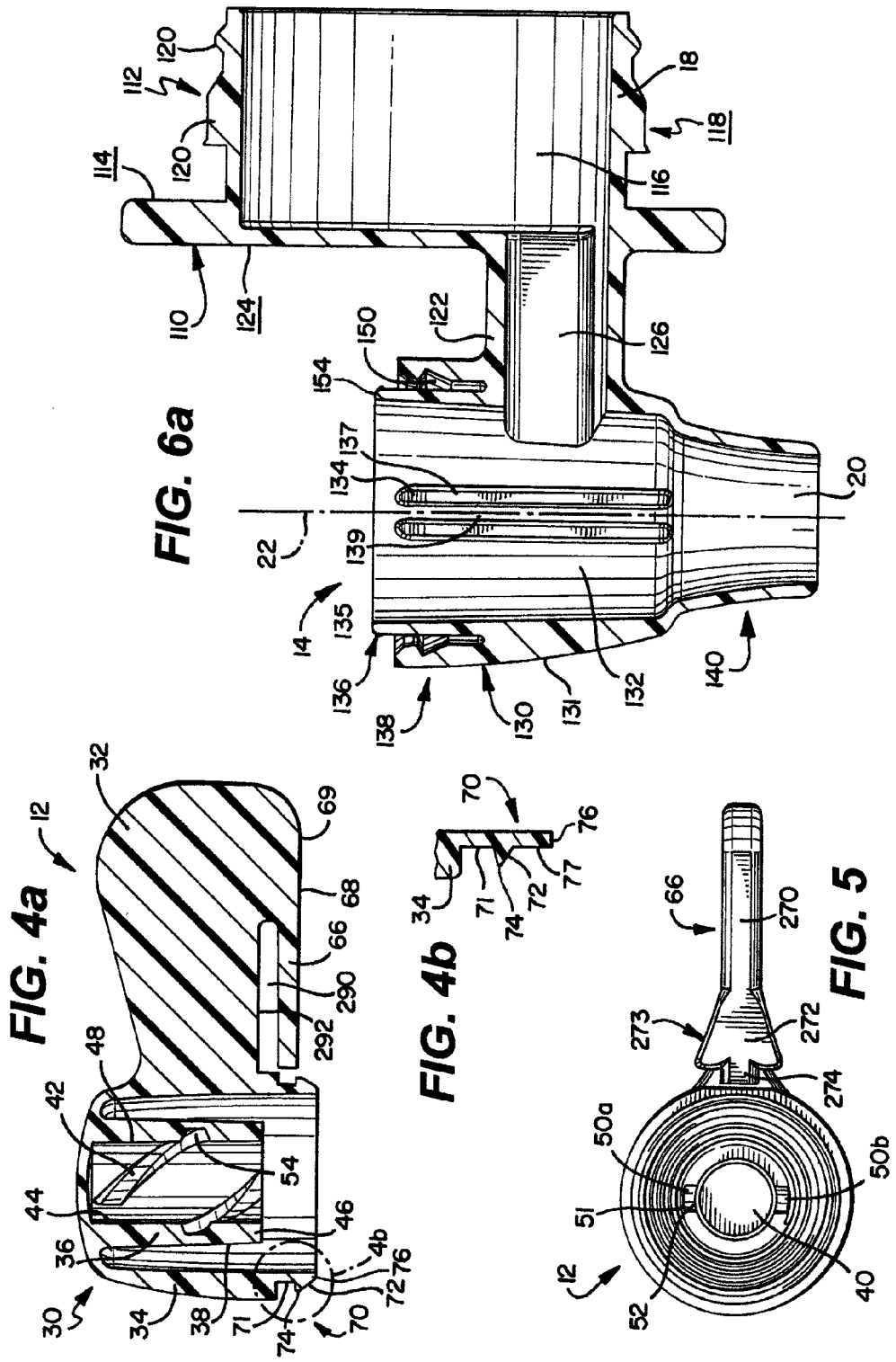

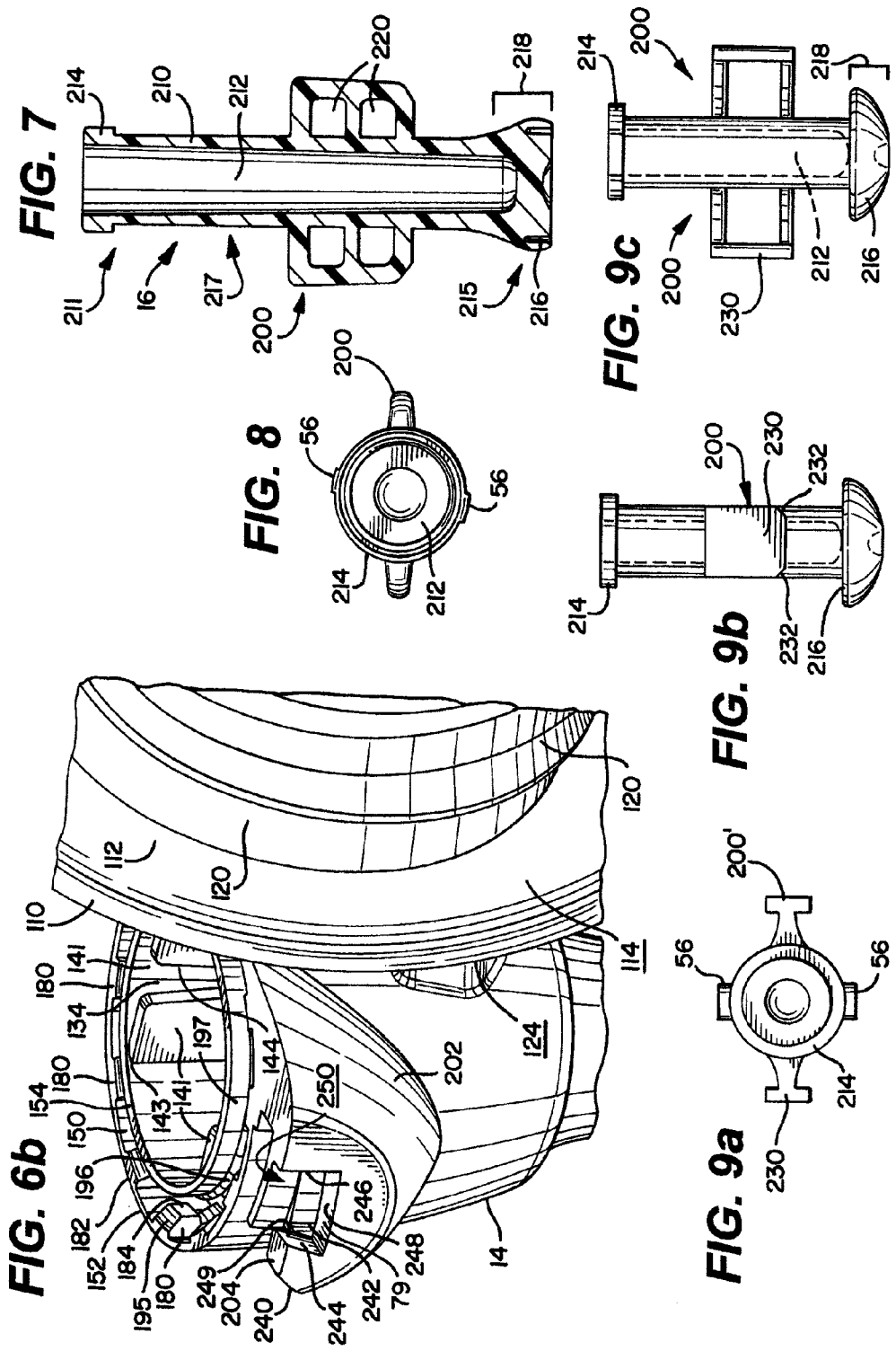

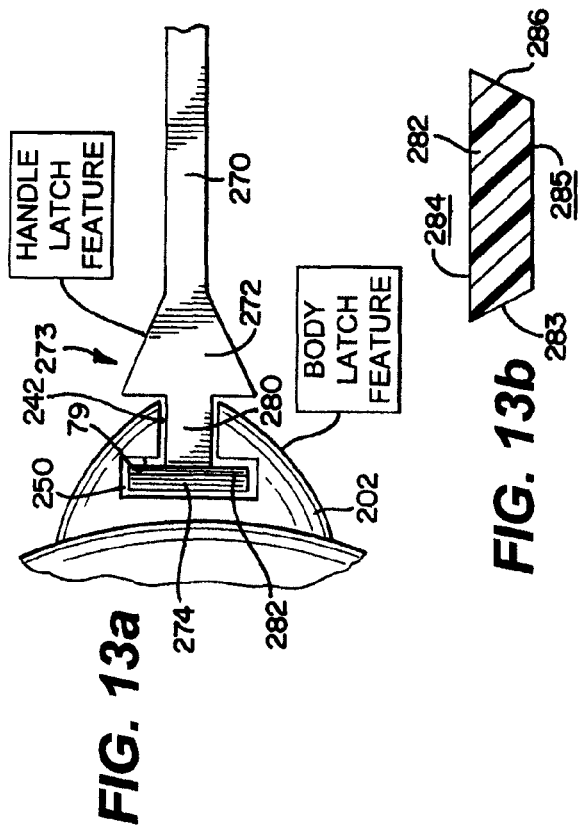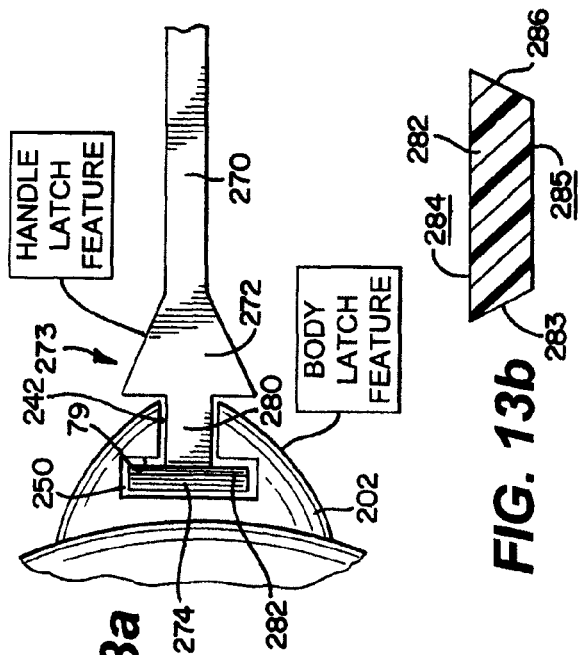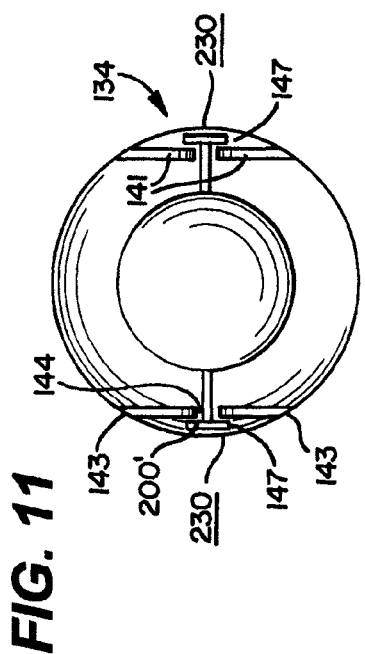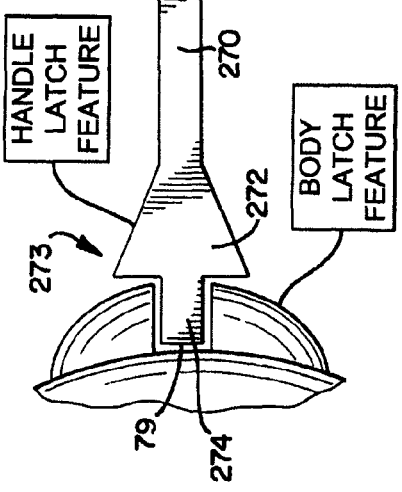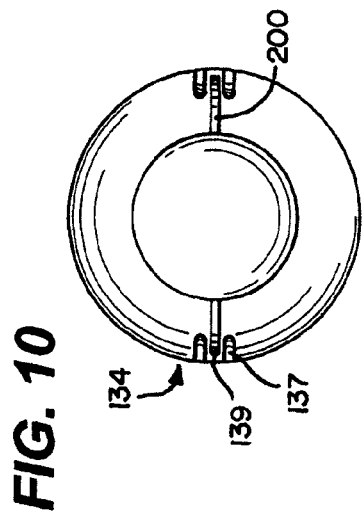

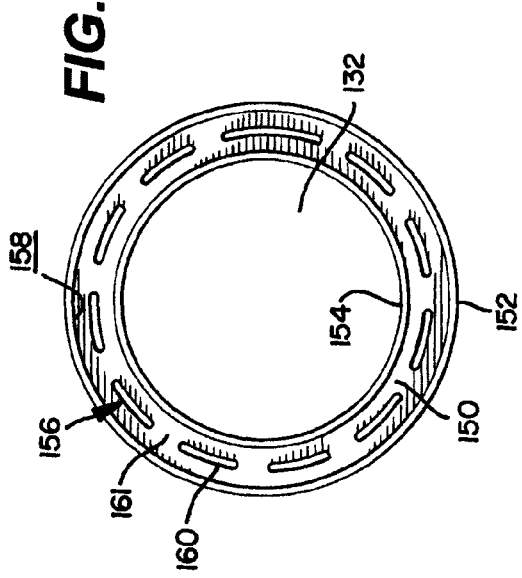
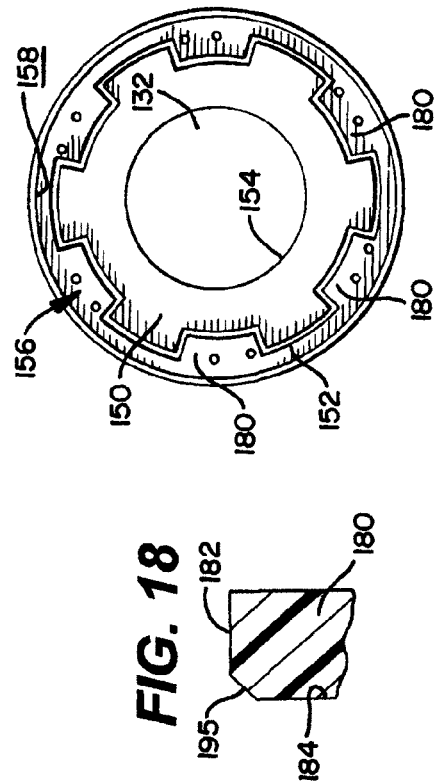
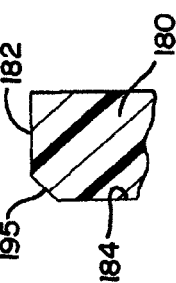
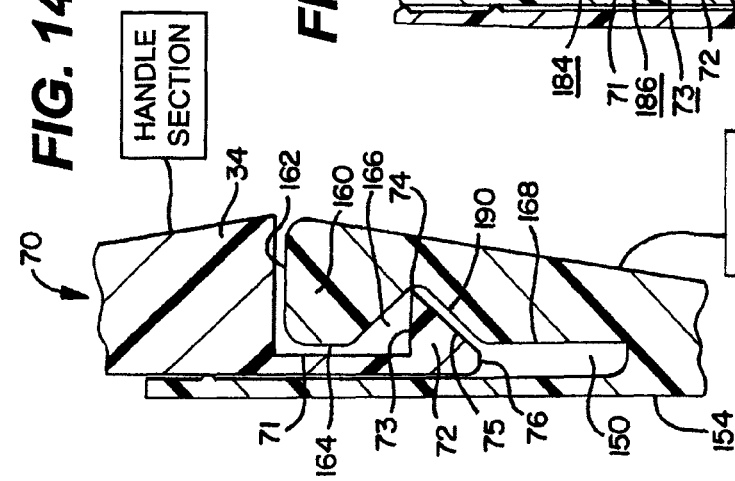

CHILD RESISTANT CLOSURE FOR A TAP

CROSS-REFERENCE TO RELATED APPLICATION

This Application claims priority to U.S. Provisional Patent Application Ser. No. 60/904,614, filed on Mar. 2, 2007, the disclosure of which is incorporated in its entirety herein by reference and made a part hereof.

FEDERALLY SPONSORED RESEARCH OR DEVELOPMENT

Not Applicable.

BACKGROUND OF THE INVENTION

1. Technical Field

The present invention relates to a tap for dispensing liquid from a container.

2. Background Art

Tap and valve assemblies have been used within the industry for dispensing fluid from a container to a receptacle or other fluid-receiving device. The typical tap assembly has an attachment member for attaching the tap assembly to a fluid container and a tap handle for positioning a valve member within the body. Moving of the valve member within the body allows for control the flow of fluid through the tap.

Prior art tap dispensing systems have as one of their primary disadvantages a propensity to vibrate open during transportation. Also, tap handles are typically easily manipulated so that children can inadvertently activate the valve allowing the contents of the container to spill causing an unnecessary mess and wastage of the stored product.

These and other aspects and attributes of the present invention will be discussed with reference to the following drawings and accompanying specification.

BRIEF DESCRIPTION OF THE DRAWINGS

FIG. 1 is a front elevation view of a tap assembly;

FIG. 2 is a side elevation view of a tap handle;

FIG. 3 is a an assembly drawing of a tap assembly broken into separate parts;

FIG. 4*a* is a side elevation view in vertical cross section of one embodiment of a tap handle;

FIG. 4*b* is a side elevation view in vertical cross section of a second embodiment of a tap handle;

FIG. 5 is a bottom view of a tap handle;

FIG. 6*a* is a side elevation view in cross section of a first embodiment of a valve body of the tap assembly;

FIG. 6*b* is a perspective view of a second embodiment of a valve body of the tap assembly;

FIG. 7 is a front elevation view of a valve stem in cross section;

FIG. 8 is a top view of one embodiment of a valve stem;

FIG. 9*a* is a top view of a second embodiment of a valve stem;

FIG. 9*b* is a side elevation view of the second embodiment of the valve stem;

FIG. 9*c* is a front elevation view of the second embodiment of the valve stem;

FIG. 10 is a top view of one embodiment of a chamber of the valve body;

FIG. 11 is a top view of a second embodiment of a chamber of the valve body;

FIG. 12 is a detailed view of one embodiment of a pawl of a tap handle inserted into a pocket of a valve body;

FIG. 13*a* is a detailed view of second embodiment a pawl of a tap handle inserted into a pocket of a valve body;

FIG. 13*b* is a view of a second rectangular portion of a pawl;

FIG. 14 is a side elevation detailed view in cutaway of one embodiment of a valve assembly showing engaging portions of the tap handle and the valve body;

FIG. 15 is a top view of one embodiment of a valve body showing tap handle retaining members;

FIG. 16 is a detailed view in side elevation and in cutaway of a second embodiment of a valve assembly showing engaging portions of the tap handle and the valve body;

FIG. 17 is a top view of a second embodiment of a valve body showing tap handle retaining members; and FIG. 18 is breakaway view of an alternate embodiment of a tab having a beveled outer surface.

DETAILED DESCRIPTION OF THE INVENTION

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

FIGS. 1 and 2 show one preferred form of a tap assembly 10 having a tap handle 12, a valve body 14 and a valve stem 16. The stem 16 can be inserted into the body 14 and the tap handle 12 can be attached to the body by hand or by machine. In one preferred form of the invention, these parts are snap fit together to form the assembly such that it is difficult to disassemble the parts without breaking or damaging them to some degree. The tap assembly 10 has a portion 18 for attaching the assembly to a liquid filled container (not shown) for dispensing the contents of the container through an exit 20 in the valve body 14 into a receiving vessel (not shown). The tap handle 12 can be moved by rotating it with respect to an axis 22 (FIG. 3) causing the valve stem 16 to move vertically, in reciprocating fashion, from a first position where the tap is sealed, and no fluid is allowed to flow through the exit 20, to a second open position where fluid is allowed to flow through the valve body and through the exit 20.

FIGS. 3-5 show the tap handle 12 having a head portion 30 and a tail portion 32. The head portion 30 has a first outer wall 34 concentrically disposed about a second inner annular wall 36 defining an annular chamber 38 between the walls. The second inner annular wall 36 defines a central chamber 40 for receiving a portion of the valve stem 16. A set of threads 42 are positioned on an inner surface 44 of the second inner annular wall 36 and extend from a proximal end 46 to a distal end 48 of the second inner annular wall 36. The threads have two generally U-shaped tracks 50*a* and 50*b* each having a bottom wall 51 and two upstanding, opposed sidewalls 52. Each track extends along a spiral path with one track rotating clockwise about axis 22 and the opposed track rotating counterclockwise about the axis 22. The opposed sidewalls 52 are horizontally spaced from one another to define a width of the track and have a height defining a depth of the tracks. Each of the tracks has a lead-in section 54 at the proximal end of the wall 46 circumferentially spaced from one another by 180°. The lead-in section of the tracks has greater width than the remaining portions of the tracks. The tracks are provided to receive a pair of lugs 56 (FIGS. 8, 9) on the valve stem 16 where the valve stem lugs 56 can move from the proximal end 46, where the valve is in a closed position, to the distal end 48 of the tracks, where the valve is in a fully opened position. The valve stem 16 can be moved from the closed position to the fully opened position, in one preferred form of the invention, by rotation of the tap handle from about 120° to about 180° about the axis 22.

The head portion 30 of the tap handle 12 carries an attaching member 70 for attaching the tap handle to the body 14 and to allow for rotational movement of the tap handle 12 about the axis 22. In one preferred form of the invention shown in FIGS. 4a and 14, the attaching member 70 has an annular collar 71 and an annular flange 72. The collar 71 is defined by a reduced diameter portion of the outer wall 34. The annular flange 72 has top surface 73 extending radially outward from the wall 34 to an end point 74 where the end point has a diameter that is larger than that of the annular collar 71 but smaller than the diameter of the outer wall 34. A front surface 75 extends from the end point downwardly and tapers axially inwardly to an end point 76. As will be discussed below, the collar 71 and the annular flange 72 are inserted into an annular space in the valve body 14 such that the tap handle 12 is retained within the valve body 14 yet able to be rotated about the axis 22 by a user of the tap assembly 10.

In a more preferred form of the invention shown in FIGS. 4b and 15, the attaching member 70 will have a second annular collar 77 on an opposite side of the annular flange 72 from the first annular collar 71.

The tail portion 32 of the tap handle 12 has a finger-grasping portion 60 having a textured planar surface 62, which in one preferred form of the invention shown in FIGS. 1 and 3, is defined by a plurality of horizontally spaced protuberances 64 each having a generally circular shape when viewed in horizontal cross section. A latch member 66 depends from a bottom edge 68 of the finger-grasping portion 60 and extends from a distal end 69 of the tail portion 32 inwardly toward the head portion 30 of the tap handle 12. The latch member 66 has an arm 270, a flange 272 extending from each opposed lateral edge from an intermediate portion of the arm 270 to form a generally arrow-shaped flange section 273, and a pawl 274 at a distal end of the arm 270. As will be described in greater detail below, the pawl 274 is dimensioned to releasably engage a pocket 79 on the valve body 14 as shown in FIGS. 12 and 13a,b to prevent rotational movement of the tap handle 12 about the axis 22.

In one preferred form of the invention the pawl 274 is generally rectangular in shape as shown in FIG. 12 and locks within a generally rectangular shaped detent or pocket 79 on the valve body 14. In a more preferred form of the invention shown in FIGS. 13a,b, the pawl 274 will have a T-shape defined by a first rectangular shaped section 280 extending in generally the same direction as the arm and a second rectangular shaped section 282 transversely disposed to the first rectangular section and being attached to the first rectangular section 280 at an intermediate portion of the second rectangular portion. The valve body 14 has a corresponding T-shaped pocket 79 (FIG. 6b) for receiving the T-shaped pawl 274. FIG. 13b shows the second rectangular section 282 in elevation having a leading surface 283 that tapers inwardly from a top surface 284 to a bottom surface 285. Optionally, the trailing edge 286 can have a complementary taper.

A gap 290 is provided between the arm 270 and a bottom edge 292 of the tail portion 32 of the tap handle 12. The gap 290 provides space for the arm to deflect when pressed by a user of the tap delivering a force in a direction generally in line with the axis 22. Moving the arm 270 upward unlocks the arm by causing the pawl 274 to extend outside of the pocket 79 to allow for rotation of the tap handle 12 about the axis 22.

The tap handle 12 provides a child protective feature to prevent opening of the valve by an under-aged user of the tap 10 and assists in preventing inadvertent opening of the tap 10 during shipping, use or at other times.

FIGS. 1, 2, 6a,b; 10, 11, and 14-17 show various aspects of two preferred forms of the valve body 14. FIGS. 6a,b show the container attaching member 18 having a face plate 110 and a first annular wall 112 extending axially away from an inner surface 114 of the face plate 110. The first annular wall 112 defines a fluid passageway 116 therethrough, and, in a preferred form of the invention, is generally cylindrical in shape. The first annular wall 112 has an outer surface 118 with a series of axially spaced rings 120 having differing diameters. The rings 120 assist in forming a fluid tight seal with a receptacle of a container that is dimensioned to form a fluid tight seal with the first annular wall 112. Suitable containers include, for example, flexible bags, semi-rigid containers, rigid containers, cartons or other type fluid container. The fluid container can be made from polymeric material, paperboard or other suitable material.

A second wall 122 extends axially away from a front surface 124 of the face plate 110 and defines a fluid channel 126 therethrough. The fluid channel 126 is in fluid communication with the fluid passageway 116.

A valve housing 130 is attached to the second wall 122 and extends in a direction transverse, and more preferably generally perpendicular, to the direction in which the second wall 122 extends. It is contemplated, however, that the valve housing 130 can extend in line with the second wall 122 or replace it all together. In a preferred form of the invention, the valve housing 130 is defined by a third wall 131 having in consecutive order, from top to bottom, a first section 136 having a first diameter, a second section 138 having a second diameter larger than the first diameter and a third section 140 having a third diameter smaller than the second diameter. The third wall is generally cylindrical and is concentrically disposed about the axis 22. The first section 136 is for receiving the attaching member 70 of the tap handle 12. The second section 138 provides at least two sets of opposed guides 134 circumferentially spaced approximately 180° from one another and each set of opposed guides 134 extending axially along opposed portions of an inner surface 135 of the third wall 131 in which opposed projections from the valve stem 16 slide therein. The third section 140 defines the fluid outlet 20.

In one preferred form of the invention shown in FIG. 6a, each guide set 134 is defined by a pair of spaced protuberances 137 extending along essentially an entire height (or length) of the intermediate section 138 and radially inwardly from an inner surface of the intermediate section defining a track 139 therebetween. Each track 139 is dimensioned to receive a wing 200 extending from opposite sides of the valve stem (FIG. 10). In a more preferred form of the invention shown in FIGS. 6b and 11, each guide 134 is generally concave-shaped chamber 147 defined between the outer wall 135 and a chord wall 141 extending between opposed points 143 along an arcuate portion of the inner wall 135 and inwardly into the valve chamber 132. The chord wall 141 has a portion removed along its height to define a slot 144. FIG. 11 shows each concave shaped chamber is dimensioned to receive a generally T-shaped wing 200' extending from opposed portions of the valve stem 16 such that the valve stem 16 is more securely retained in the channel upon experiencing axially inwardly directed forces which may dislodge the wing from chamber 147 (FIGS. 11 and 13a). The guide sets 134 restrict the movement of the valve stem 16 in the valve chamber to reciprocating movement, up and down or back and forth, in the valve chamber in response to rotation of the tap handle 12, to move the valve assembly 10 between closed and open positions.

An annular groove 150 is provided between the first section 136 and the intermediate section 138 to define an outer cylindrical wall section 152 and an inner cylindrical wall 154 each concentrically disposed about the axis 22. The groove 150 is dimensioned to receive the attaching member 70 of the tap handle 12. A retaining member 156 is provided to lock the attaching member 70 into the groove so that it is difficult to remove the tap handle from the valve body after the parts are assembled together. In one form of the invention the retaining member 156 extends from an inner surface 158 of the outer cylindrical wall 152, and, as shown in FIG. 15, is a plurality of circumferentially spaced annular protuberances 160 separated by gaps 161 that fit into and engage the collar 71 of the tap handle 12 as shown in FIG. 14. Each of the annular protuberances 160 has a generally flat top surface 162 and front edge 164 and a generally U-shaped notch 166. The top and front edges engage the collar 71 of the tap handle 12 as shown in FIG. 14 and the flange 72 of the tap handle fits within the U-shape notch 166. It is contemplated the annular protuberances 160 and gaps 161 could be replaced by a single annular protuberance that extends about the full circumference of the wall 152 and without gaps.

In a more preferred form of the invention the retaining member 156 includes a plurality of circumferentially spaced, segmented tabs 180 each having a portion extending axially inwardly into the groove 150 from the inner surface 158 of the outer cylindrical wall section 152. In one preferred form of the invention shown in FIG. 16, the tabs 180 have a generally flat upper surface 182, a generally flat front surface 184, a generally flat bottom surface 186 and an inwardly (toward the groove 150 inward from the outer wall 152) and downwardly sloping return wall 188. Unlike the U-shape notch 166 that has a rounded bottom surface 190 of the embodiment shown in FIG. 14, the flat bottom surface 186 and return wall 188 meet at a sharp point 192 to define a generally V-shaped notch. A substantial portion of a length of the top surface 73 of the flange 72 of the tap handle 12 is in registration with the bottom surface 186. Further, the end point of the flange 74 is positioned within the sharp point 192 so that the tap handle 12 is securely retained within the groove 150 of the body 14.

In another preferred form of the invention, the upper surface 182 and the front surface 184 will meet at a downwardly and inwardly sloping beveled surface 195 shown in FIG. 18. During assembly, the beveled surface 195 will serve as a lead-in when attaching the tap handle 12 to the body 14. During insertion of the attaching member 70 into the groove 150, the flange 72 of the tap handle 12 will engage the beveled surface 195 and the flange will deflect radially inwardly of the body 14 and then snap radially outwardly when the flange 72 is in registration with the V-shaped notch 192. When the attaching member 70 is fully inserted into the groove 150, the second annular collar 77 will extend nearly into the full depth of the groove 150 to further increase the retention force between the tap handle 12 and the body 14 when compared to the embodiment shown in FIG. 14 where the attaching member 70 has no second collar distal from the flange 72.

FIG. 6b also shows one preferred form of the invention having a second annular protuberance 196 extending from an outer surface 197 of the inner cylindrical wall 154. The second annular protuberance 196 cooperates with the tabs 180 to retain the tap handle 12.

FIGS. 2 and 6b show a platform 202 projecting from the outer wall 130, and in a preferred form of the invention on a portion of the outer wall opposite from where one of the guides 134 extends inside the valve chamber. In one preferred form of the invention the platform 202 has a generally quadraspherical shape (one quarter of a sphere) having an upper surface 204 having a portion removed to define the pocket 79, which is described in detail above.

FIG. 6b shows a preferred form of the platform 202 having a leading edge 240 that tapers downwardly and outwardly from the top surface 204 to form a lead-in or camming surface 240. The camming surface 240 cooperatively engages the leading edge 283 of the second rectangular section 282 of the pawl 274 when moving the tap handle 12 from an open position to a closed position. The pocket 79 of the platform 202 has a generally T-shape to conform to the shape of the pawl 274. A first portion 242 of the pocket 79 is for engaging the first rectangular section 280. The first portion 242 of the pocket 79 is shown having a front 244 and rear 246 vertically extending side walls and a horizontally extending bottom wall 248 connecting the front and rear 244, 246 front and rear walls. In a preferred form of the invention, the front wall 244 will taper 249 inwardly of the and upwardly from the bottom wall 248. The taper 249 provides an axially downward force to the pawl 274 of the latch 66 when the tap handle is rotated in a clockwise direction without providing a lifting force to the latch 66. Thus, the taper 249 assist in inadvertent actuation of the valve.

A second portion 250 of the pocket 79 is generally rectangular in shape to receive the second rectangular portion 282 of the pawl 274. The second portion 250 of the pocket 79 has a depth sufficient to receive the top and bottom surfaces 284, 285 of the second rectangular portion 282 such that the top surface 282 of the pawl 274 is flush with or below surface 204 of the platform 202.

FIGS. 2, 7-9, show two preferred forms of the valve stem 16. FIGS. 7 and 8 show the valve stem 16 has a generally tubular body 210 defining a generally hollow core 212. A first end 211 of the valve stem has a ring 214 and a pair of circumferentially spaced and radially outwardly projecting lugs 56. In a preferred form of the invention two lugs are provided and are spaced 180° from one another. A second end 215 of the valve stem 16 has flared 216 distal end having a diameter greater than that of an intermediate portion 217 of the valve stem and defines a sealing ring having a height 218. The height 218 of the sealing ring is adequate to seal the end of the fluid outlet 20 when the valve assembly is in the closed position. A pair of circumferentially spaced wings 200 extend radially outwardly from the tubular body 210, along a length of the intermediate portion 217 of the valve stem 16, and, in one preferred form of the invention, has a generally rectangular shape when viewed in horizontal cross section or from the top as shown in FIG. 8, and a generally E-shape when viewed in a side elevation view as shown in FIG. 7. Each of the wings is spaced approximately 90° from a lug 56. The E-shape is preferred over a fully filled in rectangular piece as there is a material savings by removing portions 220. The valve stem 16 of FIG. 7 is suitable for use with the valve body 14 shown in FIG. 6a and to slide within the guide 134 as shown in FIG. 10.

A second embodiment of the valve stem 16 is similar to the first embodiment but the wings 200' are modified to have a T-shape when viewed from the top (FIG. 9a) and a C-shape when viewed from a front elevation view (FIG. 9c). The top of the T has a generally rectangular surface 230 with tapering corners 232 to act as a lead in when inserting the valve stem 16 into the valve body 14 with the T-shaped wings 200' inserted into the concave shaped chamber 147 as shown in FIG. 11.

To operate the valve assembly 10 starting in the closed position as shown in FIG. 1, the valve stem 16 will be fully inserted into the valve body 14 such that the flared distal end 216 of the stem 16 is inserted into an end portion of the fluid outlet 20 to prevent the flow of fluid. The opposed lugs 56 of the valve stem 16 will be positioned, one of each, into the U-shaped tracks 50a,b of the tap handle 12. The pawl 274 of the tap handle 12 will be positioned within the pocket 79 as shown in FIGS. 12, 13. A user of the tap will press the arm 270 upward to disengage the pawl 274 from the pocket 79 and rotating the tap handle about the axis 22 in a clockwise direction. The rotational movement of the tap handle 12 will cause an upward movement of the valve stem 16 as the lugs 56 travel along the tracks 50a,b and the valve stem 16 is directed by the guides 134 to move the flared portion 216 of the valve stem 16 out of contact with an end wall of the spout 20 to allow fluid to flow outward from the tap assembly 10. To close the valve the tap handle 12 is rotated counterclockwise until the pawl 274 is within the pocket 79. Of course, it is contemplated that the direction of rotation could be reversed such that a counterclockwise rotation opens the valve assembly 10 and a clockwise rotation closes the valve assembly 10.

The parts of the tap assembly 10 are generally formed from polymeric materials using techniques such as injection molding. Suitable polymeric materials include polyolefins, polyamides, polyesters, PVC, polycarbonates and the like. Suitable polyolefins include homopolymers, copolymers and terpolymers from alpha-olefins having from two to eight carbon atoms. Suitable copolymers include ethylene and propylene with monomers selected from these alpha-olefins, excluding of course those having the same number of carbon atoms.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims

What is claimed is:

1. A tap assembly comprising:
a valve body having a first wall and a second wall, the first wall defining a valve chamber, the first wall having a generally cylindrical shape, a pair of opposed tracks extending axially along an inner surface of the first wall, a fluid exit, a platform extending outward from an outer surface of the first wall and having a pocket for engaging a portion of a tap handle, to resist rotation of the tap handle with respect to the valve body, the second wall being concentrically disposed with respect to the first wall and spaced axially inwardly therefrom to define an annular groove therebetween;
the tap handle being mounted to the valve body for rotational movement of the tap handle with respect to the first wall, the tap handle having a third wall defining an annular chamber and supporting a set of threads; and
a generally tubular stem having a first end and an opposed second end, the first end having a pair of lugs circumferentially spaced from one another, the lugs being positioned within the set of threads, the second end of the valve stem extending into the valve chamber, the valve stem is responsive to movement of the tap handle to move from a first position where the fluid exit is sealed by the second end of the valve stem to a second position where the fluid exit is not sealed by the second end of the valve stem and fluid is allowed to flow through the fluid exit.

2. The assembly of claim 1 wherein the pocket has a rectangular shape.

3. The assembly of claim 1 wherein the pocket has a generally T-shape.

4. The assembly of claim 1 wherein the platform has a camming surface for engaging a portion of the tap handle.

5. The assembly of claim 1 wherein the pocket has a vertical wall that has a tapered portion extending inwardly and upwardly.

6. The assembly of claim 1 wherein each of the tracks is positioned between a pair of protuberances extending axially along and radially inwardly from an inner surface of the valve body.

7. The assembly of claim 6 further comprising a pair of circumferentially spaced chord walls in the valve chamber each having a centrally disposed slot defining the tracks.

8. The assembly of claim 1 wherein the tap handle has a head portion and a tail portion, the head portion having a member for attaching the tap handle to the valve body.

9. The assembly of claim 8 wherein the member for attaching comprises a first collar and an annular flange axially spaced from the first collar.

10. The assembly of claim 9 further comprising a second collar axially spaced from the annular flange such that the annular flange is positioned between the first collar and the second collar.

11. The assembly of claim 10 wherein the first collar and the second collar comprise reduced diameter portions of the second wall.

12. The assembly of claim 11 wherein the annular flange has a top surface extending radially outwardly from the second wall and terminates at a first end point.

13. The assembly of claim 12 wherein the annular flange has a front surface extending from the end point axially downwardly and axially inwardly and terminates at a second end point.

14. The assembly of claim 8 wherein the member for attaching is positioned in the annular groove.

15. The assembly of claim 9 further comprising a retaining member attached to the valve body and positioned in the annular grove.

16. The assembly of claim 15 wherein the retaining member is connected to the first wall or the second wall.

17. The assembly of claim 16 wherein a portion of the retaining member is positioned in the first collar.

18. The assembly of claim 16 wherein the retaining member comprises an annular protuberance.

19. The assembly of claim 16 wherein the retaining member comprises a plurality of spaced protuberances.

20. The assembly of claim 16 wherein the retaining member comprises a plurality of circumferentially spaced tabs extending from an inner surface of the first wall.

21. The assembly of claim 20 wherein the tabs are segmented.

22. The assembly of claim 21 wherein the tabs have a notch for receiving a portion of the annular flange.

23. The assembly of claim 22 wherein the notch is generally U-shaped or V-shaped.

24. The assembly of claim 8 wherein the tail portion has a finger-grasping surface and a latch member for engaging a portion of the valve body to resist rotation of the tap handle.

25. The assembly of claim 24 wherein the latch member has an arm and a pawl extending from the arm.

26. The assembly of claim 25 wherein the pawl is generally T-shaped.

27. The assembly of claim 25 wherein the latch further comprises a flange extending from the arm.

28. The assembly of claim 27 wherein the flange is generally arrow shaped.

29. The assembly of claim 1 wherein the valve stem has a pair of circumferentially spaced wings extending radially outwardly from an outer surface of the valve stem and axially along a portion of a height of the valve stem, one of each of the wings being positioned in one of each of the tracks.

30. The assembly of claim 29 wherein each of the wings has a generally rectangular shape when viewed in horizontal cross section.

31. The assembly of claim 29 wherein each of the wings has a generally T-shape when viewed in horizontal cross section.

32. The assembly of claim 29 wherein each of the wings are circumferentially spaced from the lugs.

33. The assembly of claim 29 wherein the valve stem has a flared distal end positioned in the fluid exit.

* * * * *